United States Patent [19]

McDonough

[11] Patent Number: 4,573,527
[45] Date of Patent: Mar. 4, 1986

[54] HEAT EXCHANGER CLOSURE CONNECTION

[76] Inventor: M. J. McDonough, P.O. Box 40082, Houston, Tex. 77240

[21] Appl. No.: 518,547

[22] Filed: Jul. 29, 1983

[51] Int. Cl.[4] .............................................. F28F 9/26
[52] U.S. Cl. .............................. 165/154; 285/133.1; 285/368; 165/143
[58] Field of Search ........................... 165/158, 154; 285/133 R, 133 A, 137 R, 137 A, 363, 368

[56] References Cited

U.S. PATENT DOCUMENTS

| | | | |
|---|---|---|---|
| 1,834,968 | 12/1931 | Rector | 285/133 A |
| 2,449,052 | 9/1948 | Brown, Jr. | 285/133 R |
| 2,520,755 | 8/1950 | Brown | 165/158 |
| 3,018,090 | 1/1962 | Kaase et al. | 165/143 |
| 3,079,992 | 3/1963 | Otten et al. | 165/158 |
| 3,155,404 | 11/1964 | Brown et al. | 165/158 |
| 3,221,808 | 12/1965 | Pyle | 165/158 |
| 3,526,275 | 9/1970 | Vance et al. | 165/103 |
| 3,605,880 | 9/1971 | Smith | 165/158 |
| 3,797,564 | 3/1974 | Dickinson | 165/158 |
| 4,208,529 | 6/1980 | Murray | 165/158 |

FOREIGN PATENT DOCUMENTS

| | | | |
|---|---|---|---|
| 538769 | 11/1931 | Fed. Rep. of Germany | 165/158 |
| 2162903 | 6/1973 | Fed. Rep. of Germany | 285/368 |
| 677180 | 8/1952 | United Kingdom | 285/368 |

*Primary Examiner*—Albert W. Davis, Jr.
*Attorney, Agent, or Firm*—Bernard A. Reiter; Mark Bocchetti

[57] ABSTRACT

Disclosed is a heat exchanger closure connection for establishing a shell side closure between the heat exchanger tubes and the shell and a tube side closure for establishing a connection between the tubes and a tube end extension. The shell includes an outwardly extending shell closure flange having a sealing surface. The tube includes an outwardly extending tube closure flange having axially spaced apart first and second seal surfaces. A first seal ring is positioned between the sealing surfaces of the shell closure flange and the first seal surface of the tube closure flange. A split ring is retained in a groove in the tube closure flange intermediate the first and second seal surfaces thereof. A locking flange is positioned about the tube closure flange in engagement with the split ring to transmit axial forces to the split ring and tube closure flange in the direction of the shell closure flange. Bolts or the like are provided for urging the locking flange toward the shell closure flange. The tube end extension tube includes an outwardly extending tube end closure flange having a sealing surface positioned adjacent the second sealing surface of the tube closure flange. A second seal ring is positioned between the tube end closure flange sealing surface and the tube closure flange sealing surface. A set of bolts or the like are provided for independently urging the tube end closure flange toward the locking flange.

16 Claims, 3 Drawing Figures

HEAT EXCHANGER CLOSURE CONNECTION

BACKGROUND OF THE INVENTION

1. Field of the Invention

The present invention relates generally to heat exchanger closure connections, and more particularly to a heat exchanger closure connection having shellside and tubeside seals held together by a common flange with common or separate bolts which allows removal of the tubeside connection and seal without removal of the shellside connection and seal.

2. Description of the Prior Art

As the name implies, heat exchangers are devices for transfering heat energy. Typically, such transfer is from one fluid to another. One common variety of heat exchange device is the double pipe heat exchanger which includes an outer pipe or shell which carries one of the fluids and one or more inner pipes or tubes which carries the other fluids. The space interior of the shell and exterior of the tubes is referred to as the shellside and the space within the tubes is referred to as the tube side.

There have been developed a number of closures for establishing sealing inner connections in double pipe exchangers. For example, in U.S. Pat. No. 3,424,480, there is disclosed a double seal closure connection which is adapted to establish a shellside connection and a tubeside connection with a common set of bolts holding the connections together. One disadvantage of the closure connection of the '480 patent is the fact that the common set of bolts is subjected to differential temperatures and pressures and to various vibrations or pulsations. Thus, environmental conditions that affect one of the seals also affect the other seal, thereby making the seals interdependent. A further disadvantage in the construction of the closure connection of the '480 patent is in that the tubeside connection and seal cannot be broken without also breaking the shellside connection and seal. Such further disadvantage manifests itself when it becomes necessary to clean or inspect the tubeside, which involves opening the tubeside connection. Since the tubeside connection cannot be opened without also opening the shellside connection, the entire exchanger must be taken out of service.

In U.S. Pat. No. 3,593,782 there is disclosed a heat exchanger closure connection which has separate shellside and tubeside closures. Thus, the closure seals are independent of each other and tubeside connection can be dismantled to allow cleaning or inspection of the tubeside without disturbing the shellside closure. Likewise, the shellside seal may be inspected without disturbing the tubeside seal. However, the construction of the closure of the '782 patent requires more than a single set of bolts or the like for assembly, and accordingly, is more expensive to produce than the closures of the type exemplified by U.S. Pat. No. 3,424,480.

It is therefore an object of the present invention to provide a heat exchange closure connection which overcomes the shortcomings of the prior art. More specifically, it is an object of the present invention to provide a heat exchange closure connection which establishes independent shellside and tubeside closures with a common flange using either common or separate sets of bolts.

SUMMARY OF THE INVENTION

Briefly stated, the foregoing and other objects are accomplished by the heat exchanger closure connection of the present invention. The closure connection includes a shell closure flange extending outwardly from the shell and including a shell closure flange sealing surface. A tube closure flange extends outwardly from the inner tube, which is positioned within the shell, and includes axially spaced apart first and second sealing surfaces. A first seal ring is positioned between the first sealing surface of the tube closure flange and the shell closure flange sealing surface. A split ring assembly is carried in a circumferential retaining groove in the tube closure flange intermediate the first and second seal surfaces. A locking flange is positioned about the tube closure flange to retain the split ring assembly in the retaining groove and transmit axial forces on the split ring assembly toward the shell closure flange. A plurality of bolts are provided for urging the locking flange toward the shell closure flange thereby to interconnect the tube closure flange and the shell closure flange and to urge the first sealing surface of the tube closure flange and the shell closure flange sealing surface into sealing engagement with the first seal ring.

The closure connection also includes a tube end closure flange which extends outwardly from a tube and extension tube which is positioned axially adjacent to the inner tube. The tube end closure flange includes a sealing surface positioned adjacent the second sealing surface of the tube closure flange. A second seal ring is positioned between the tube end closure flange sealing surface and the tube closure flange sealing surface. The bolts that connect together the locking flange and the shell closure flange are operable to urge the tube end closure flange toward the locking flange thereby to interconnect the tube end closure flange and the tube closure flange and to urge the second seal surface of the tube closure flange and the tube end closure sealing surface into sealing engagement with the second seal ring.

DESCRIPTION OF THE PREFERRED EMBODIMENT

Figure 1:
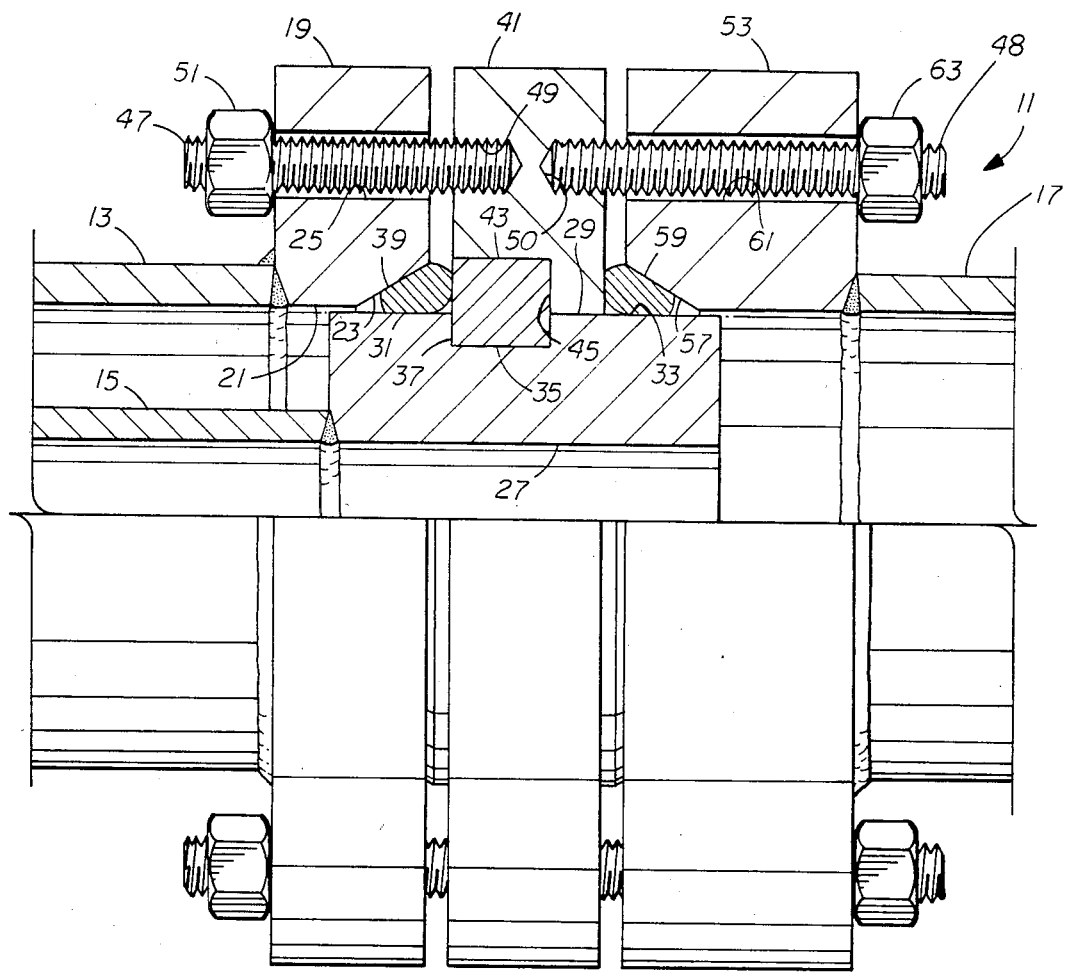
FIG. 1 is a quarter section view of the preferred embodiment of the heat exchanger closure connection of the present invention.

Referring now to the drawings, and first to Fig. 1, the heat exchanger closure connection of the present invention is designated generally by the numeral 11. Closure connection 11 is adapted for use in a heat exchanger which includes a tubular shell 13 and at least one inner tube 15. Closure connection 11 is adapted to provide a sealing interconnection between shell 13 and inner tube 15 and to provide a sealing interconnection with a tube end extension tube 17, which provides a flow way to inner tube 15.

Closure connection 11 includes an annular shell closure flange 19 which is connected to shell 13 by welding or the like. Shell closure flange 19 includes an internal straight portion 21 and a sealing surface, which in the preferred embodiment is an outwardly extending internal frustoconical surface 23. Shell closure flange 19 includes a plurality of unthreaded bolt holes, as for example bolt hole 25.

Closure connection 11 further includes a tube closure flange 27 which is connected to inner tube 15 by welding or the like. In the preferred embodiment, tube closure flange 27 includes an axially extending cylindrical outer surface 29 which includes a cylindrical first sealing surface 31 and an axially spaced apart second cylindrical sealing surface 33. Preferably, tube closure flange 27 has an outside diameter less than the inside diameter of straight portion 21 of shell closure flange 19 so as to allow inner tube 15 and tube closure flange 27 to be withdrawn through shell closure flange 19 and shell 13.

Tube closure flange 27 includes a circumferentially extending retainer groove 35 intermediate sealing surfaces 31 and 33. Retainer groove 35 is adapted to receive a split ring assembly 37 which extends radially outwardly from outer surface 29 of tube closure flange 27.

A first seal ring 39 is positioned about the first sealing surface 31 of tube closure flange 27 and within shell closure flange sealing surface 23. First seal ring 39 abuts with split ring assembly 37 and is adapted to be urged into sealing engagement with first seal surface 31 of tube closure flange 27 and shell closure flange sealing surface 23. An annular locking flange 41 is positioned about tube closure flange 27 and includes an annular recess having an axially extending surface 43 for retaining split ring assembly 37 in retainer groove 35 and a radial surface 45 for transmitting axial forces to split ring assembly 37 toward shell closure flange 19.

A plurality of threaded members or studs 47 are provided for interconnecting locking flange 41 and shell closure flange 19. Locking flange 41 includes a plurality of threaded holes 49 which threadedly engage studs 47. Studs 47 extend through unthreaded holes 25 and shell closure flange 19 into threaded engagement with nuts 51. As nuts 51 are tightened, locking flange 41 is urged axially toward shell closure flange 19, thereby to urge first sealing surface 31 of tube closure flange 27 and shell closure flange sealing surface 23 into sealing engagement with first seal ring 39 and to form a structural connection between shell closure flange 19 and tube closure flange 27 through split ring assembly 37.

Closure connection 11 also includes a tube end closure flange 53 which is connected to extension tube 17 by welding or the like. Tube end closure flange 53 includes a seal surface, which in the preferred embodiment is an outwardly facing frustoconical internal tube end closure flange sealing surface 57. A second seal ring 59 is positioned about second sealing surface 33 of tube closure flange 27 and within tube end closure flange sealing surface 57 and in abutment with locking flange 41.

Means are provided for urging tube end closure flange 53 axially toward locking flange 41. In the preferred embodiment, such means are provided by a plurality of studs 48 which extend axially through a plurality of unthreaded holes 61 in tube end closure flange 53 into engagement with threaded stud holes 50. A plurality of nuts 63 are provided for engaging studs 48 to interconnect tube end closure flange 53 and locking flange 41. As nuts 63 are tightened, tube end closure flange 53 is urged axially toward locking flange 41, thereby to urge tube end closure flange sealing surface 57 and second sealing surface 33 of tube closure flange 27 into sealing engagement with sealing ring 59. Tube end closure flange 53 may be removed from connection with tube closure flange 27 without disturbing the connection between shell closure flange 19 and locking flange 41 simply by removing nuts 63.

Figure 2:
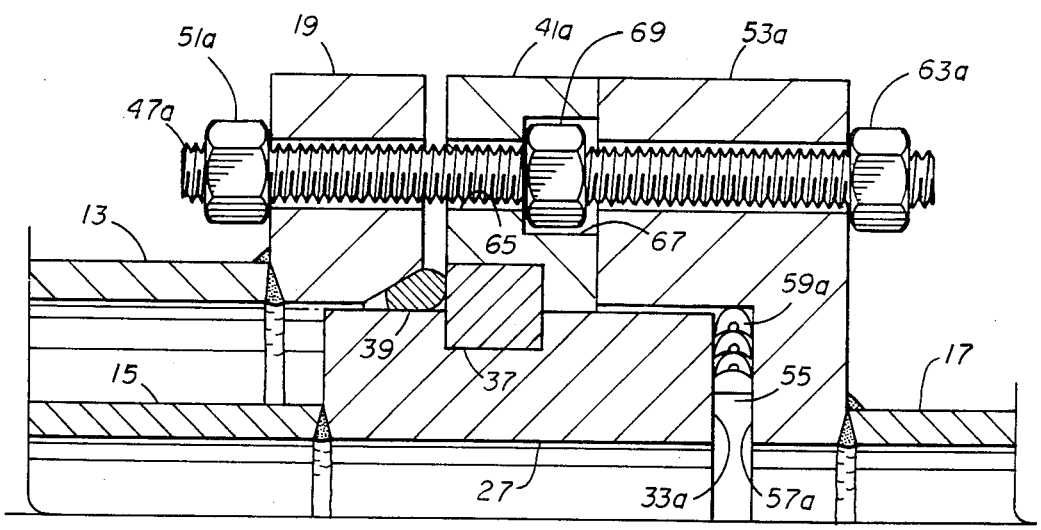
FIG. 2 is a fragmental sectional view of one alternative embodiment of the heat exchanger closure connection of the present invention.

Referring now to FIG. 2, there is shown an alternative embodiment of the present invention. The embodiment of FIG. 2 is substantially similar to the embodiment of FIG. 1, with the exception that alternative means for providing a seal between tube closure flange 27 and tube end closure flange 53a, and for establishing interconnection between locking flange 41a and tube end closure flange 53a.

The seal between tube closure flange 27 and tube end closure flange 53a is provided by a second seal ring 59a, which includes a plurality of concentric pressure energized chevron packing rings. Second seal ring 59a seals between second sealing surface 33a of tube closure flange 27 and tube end closure flange sealing surface 57a. Second sealing surface 33a is formed on the end of tube end closure flange 27 and tube end closure flange sealing surface 57a is formed in a recess 55 and tube end closure flange 53a. Means are provided for spacing apart second sealing surface 33a from tube end closure flange sealing surface 57a so as not to overcompress second seal ring 59a. Such means are accomplished by forming tube end closure flange 53a to abut with locking flange 41a.

In the embodiment of FIG. 2, locking ring 41a includes an unthreaded hole 65 and a countersunk bore 67. A stud 47a extends through shell closure flange 19, locking flange 41a, and tube end closure flange 53a. Stud 47a is fixed against axial movement with respect to locking flange 41a in the direction of shell closure flange 19 by a lock nut 69 threadedly engaged with stud 47a within countersunk bore 67. Thus, a nut 51a threaded onto stud 47a serves to urge shell closure flange 19 and locking flange 41a together. A nut 63a threaded onto the other end of stud 47a serves to urge tube end closure flange 53a toward locking flange 41a. The arrangement of FIG. 2 allows tube end closure flange 53a to be disconnected from locking flange 41a without disturbing the connection between shell closure flange 19 and locking flange 41a.

It will, of course, be recognized that the embodiment of FIG. 1 may be modified to include one or the other of the features of the embodiment of FIG. 2. For example, the means for urging the tube end closure flange toward the locking flange of FIG. 2 may be substituted for the arrangement shown in FIG. 1 without modifying the arrangement for forming a seal between the tube end closure flange and the tube closure flange. Likewise, the alternative means for forming a seal between the tube closure flange and the tube end closure flange may be incorporated into the arrangement of FIG. 1 without modifying the means for urging the tube end closure flange toward the locking ring. In other words, the alternative features of the embodiment of FIG. 2 are independent of each other and may be incorporated into the invention separately, all as would be apparent to one skilled in the art having the benefit of this disclosure.

Figure 3:
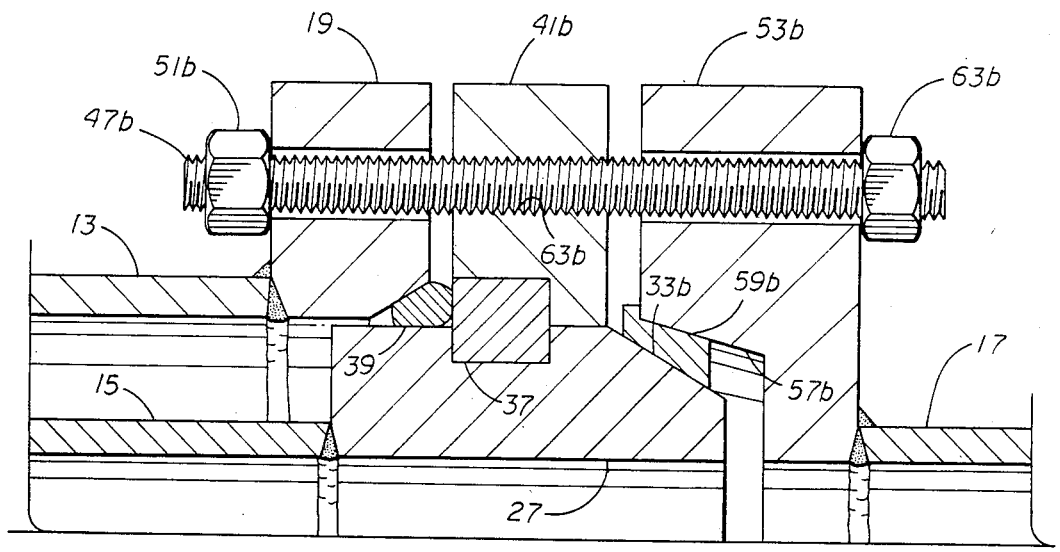
FIG. 3 is a fragmental sectional view of a further alternative embodiment of the heat exchanger closure connection of the present invention.

Referring now to FIG. 3, there is disclosed a further alternative embodiment of the present invention. In the embodiment of FIG. 3, the second sealing surface of tube closure flange 27 is formed by an inwardly tapered frustoconical exterior surface 33b. The sealing surface of tube end closure flange 53b is formed by an outwardly facing frustoconical internal surface 57b. The angle of taper of second sealing surface 33b with respect to the axis of tube closure flange 27 is greater than the angle of taper of surface 57b of tube end closure flange 53b.

A second seal ring 59b is provided for forming a seal between second sealing surface 33b and tube end closure flange sealing surface 57b. Second seal ring 59b is generally trapezoidal in cross section and interfits between surfaces 33b and 57b in dovetail fashion. Second seal ring 59b thus provides a pressure energized or enhanced seal between surfaces 33b and 57b in that as internal pressure is increased, second seal ring 59b is driven into tighter engagement with surfaces 33b and 57b.

In the embodiment of FIG. 3, locking flange 41b includes a plurality of threaded holes 65b. A plurality of studs 47b are threadedly engaged with holes 65b and extend axially outward in both directions from locking flange 41b through shell closure flange 19 and tube end closure flange 53b. Nuts 51b and 63b are provided for establishing interconnection between shell closure flange 19 and locking flange 41b and tube end closure flange 53b, respectively.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described, parts may be reversed and certain features of the invention may be utilized independently of the use of other features, all as would be apparent to one skilled in the art after having the benefit of this description of the invention.

What is claimed:

1. A heat exchanger closure connection, which comprises:
    a tubular shell including an outwardly extending shell closure flange having a shell closure flange sealing surface;
    an inner tube positioned within said shell and including an outwardly extending tube closure flange, said tube closure flange including a first sealing surface and an axially spaced apart second sealing surface;
    a locking flange positioned about said tube closure flange between said first and second sealing surfaces of said tube closure flange;
    a first seal ring positioned between said first seal surface of said tube closure flange and said shell closure flange sealing surface;
    means for interconnecting said locking flange with said tube closure flange and transmitting axial forces on said locking flange toward said shell closure flange;
    first means for urging said locking flange toward said shell closure flange, thereby to interconnect said tube closure flange and said shell closure flange and to urge said shell closure flange sealing surface and first sealing surface of said tube closure flange into sealing engagement with said first seal ring;
    a tube end extension tube extending axially from said inner tube and including an outwardly extending tube end closure flange having a tube end closure flange sealing surface positioned adjacent said second sealing surface of said tube closure flange;
    a second seal ring positioned between said tube end closure flange sealing surface and said tube closure flange sealing surface;
    and a second means for urging said tube end closure flange toward said locking flange, thereby to interconnect said tube closure flange and tube end closure flange and to urge said second seal surface of said tube closure flange and said tube end closure sealing surface into sealing engagement with said second seal ring.

2. The heat exchanger closure connection as claimed in claim 1, wherein:
    said first means for urging said locking flange toward said shell closure flange includes a treaded member threadedly engaged with said locking flange and extending through said shell closure flange.

3. The heat exchanger closure connection as claimed in claim 2, wherein said second means for urging said tube end closure flange toward said locking flange includes a second threaded member threadedly engaged with said locking flange and extending through said tube end closure flange.

4. The heat exchanger closure connection as claimed in claim 1 wherein said first means for urging said locking flange toward said shell closure flange and said second means for urging said tube end closure flange toward said locking flange includes:
    threaded means extending between said shell closure flange, said locking flange and said tube end flange;
    nuts on each end of said threaded the outboard of said shell closure flange and said tube end flange;
    and means for preventing axial movement of said threaded member toward said shell closure flange with respect to said locking flange.

5. The heat exchanger closure connection as claimed in claim 4, wherein said axial movement preventing means includes a threaded interconnection between said locking flange and said shell closure flange.

6. The heat exchanger closure connection as claimed in claim 4, wherein said axial movement preventing means includes a locking nut threadedly engaged with said threaded member and positioned between said locking flange and said tube end closure flange in abuttment with said locking flange.

7. The heat exchanger closure connection as claimed in claim 6, wherein said locking flange includes a countersunk bore receiving said locking nut.

8. A heat exchanger closure connection, which comprises:
    a tubular shell including an outwardly extending shell closure flange, said shell closure flange including an outwardly flaring frusto-conical sealing surface;
    an inner tube positioned within said shell and including an outwardly extending tube closure flange, said tube closure flange having an axially extending cylindrical sealing surface about the periphery thereof having a diameter less than the inside diameter of said shell closure flange, said tube closure flange sealing surface including a retaining groove intermediate the ends thereof;
    a split ring assembly positioned in said retaining groove and extending radially outwardly from said tube closure flange sealing surface;

a first ring seal positioned about said tube closure flange sealing surface and within said shell closure flange sealing surface in abutment with said split ring assembly and preventing fluid contact therewith;

an annular locking flange positioned about said tube closure flange and having means for engaging the other side of said split ring assembly and for retaining said split ring assembly within said retaining groove;

first means for urging said locking flange axially toward said shell closure flange thereby to interconnect said locking flange and shell closure flange and to urge said first seal ring into sealing engagement with said shell closure flange sealing surface and said tube closure flange sealing surface;

a tube end extension tube extending axially from said inner tube, said tube end extension tube including an outwardly extending tube end closure flange, said end closure flange including an outwardly flaring internal frusto-conical sealing surface sealing with said tube closure flange sealing surface;

a second seal ring positioned about said tube closure flange sealing surface and within said tube end closure flange sealing surface in abutment with said locking flange;

and a second means for urging said tube end closure flange axially toward said locking flange, thereby to interconnect said locking flange and tube end closure flange and to urge said second seal ring into sealing engagement with said tube end closure flange sealing surface while not affecting the sealing engagement of the first seal ring and said tube closure flange sealing surface.

9. The heat exchanger closure connection as claimed in claim 8, wherein:

said means for urging said locking flange toward said shell closure flange includes a treaded member threadedly engaged with said locking flange and extending through said tube closure flange.

10. The heat exchanger closure connection as claimed in claim 8, wherein said second means for urging said tube end closure flange toward said locking flange includes a second threaded member threadedly engaged with said locking flange and said tube end closure flange.

11. The heat exchanger closure connection as claimed in claim 8, wherein said first means for urging said locking flange toward said shell closure flange and said second means for urging said tube end closure flange toward said locking flange include:

threaded means extending between said shell closure flange, said locking flange and said tube end flange;

nuts on each end of said threaded member outboard of said shell closure flange and said tube end flange;

and means for preventing axial movement of said threaded member toward said shell closure flange with respect to said locking flange.

12. The heat exchanger closure connection as claimed in claim 11, wherein said axial movement preventing means includes a threaded interconnection between said locking flange and said shell closure flange.

13. The heat exchanger closure connection as claimed in claim 11, wherein said axial movement preventing means includes a locking nut threadedly engaged with said threaded member and positioned between said locking flange and said tube end closure flange in abuttment with said locking flange.

14. The heat exchanger closure connection as claimed in claim 13, wherein said locking flange includes a countersunk bore receiving said locking nut.

15. A heat exchanger closure connection, which comprises:

a tubular shell including an outwardly extending shell closure flange having a shell closure flange seal surface;

an inner tube positioned within said shell and including an outwardly extending tube closure flange, said tube closure flange including a first sealing surface and an axially spaced apart second sealing surface;

a locking flange positioned about said tube closure flange between said first and second sealing surfaces of said tube closure flange;

a first seal ring positioned between said first seal surface of said tube closure flange and said shell closure flange sealing surface defining a fluid enclosure area;

means for interconnecting said locking flange with said tube closure flange and transmitting axial forces on said locking flange toward said shell closure flange disposed externally of said fluid enclosure area;

first means for urging said locking flange toward said shell closure flange, thereby to interconnect said tube closure flange and said shell closure flange and to urge said shell closure flange sealing surface and first sealing surface of said tube closure flange into sealing engagement with said first seal ring while not affecting the sealing engagement of the second seal ring.

a tube end extension tube extending axially from said inner tube and including an outwardly extending tube end closure flange having a tube end closure flange sealing surface positioned adjacent said second sealing surface of said tube closure flange;

a second seal ring positioned between said tube closure flange closure flange sealing surface and said tube closure flange sealing surface;

and a second means for urging said tube end closure flange toward said locking flange, thereby to interconnect said tube closure flange and tube end closure flange and to urge said second seal surface of said tube closure flange and said tube end closure sealing surface into sealing engagement with said second seal ring while not affecting the sealing engagement of the first seal ring.

16. The heat exchanger closure connection of claim 15, wherein said means for interconnecting said locking flange with said tube closure flange is disposed axially externally of the fluid enclosure area and the shell closure flange so as to facilitate assembly and disassembly of the heat exchanger closure connection for repair and maintenance by precluding corrosive attack on said means for interconnecting said locking flange with said tube closure flange.

* * * * *